Nov. 13, 1951  H. E. BÜCKEN  2,574,907
EXTRUSION APPARATUS
Filed Sept. 9, 1949
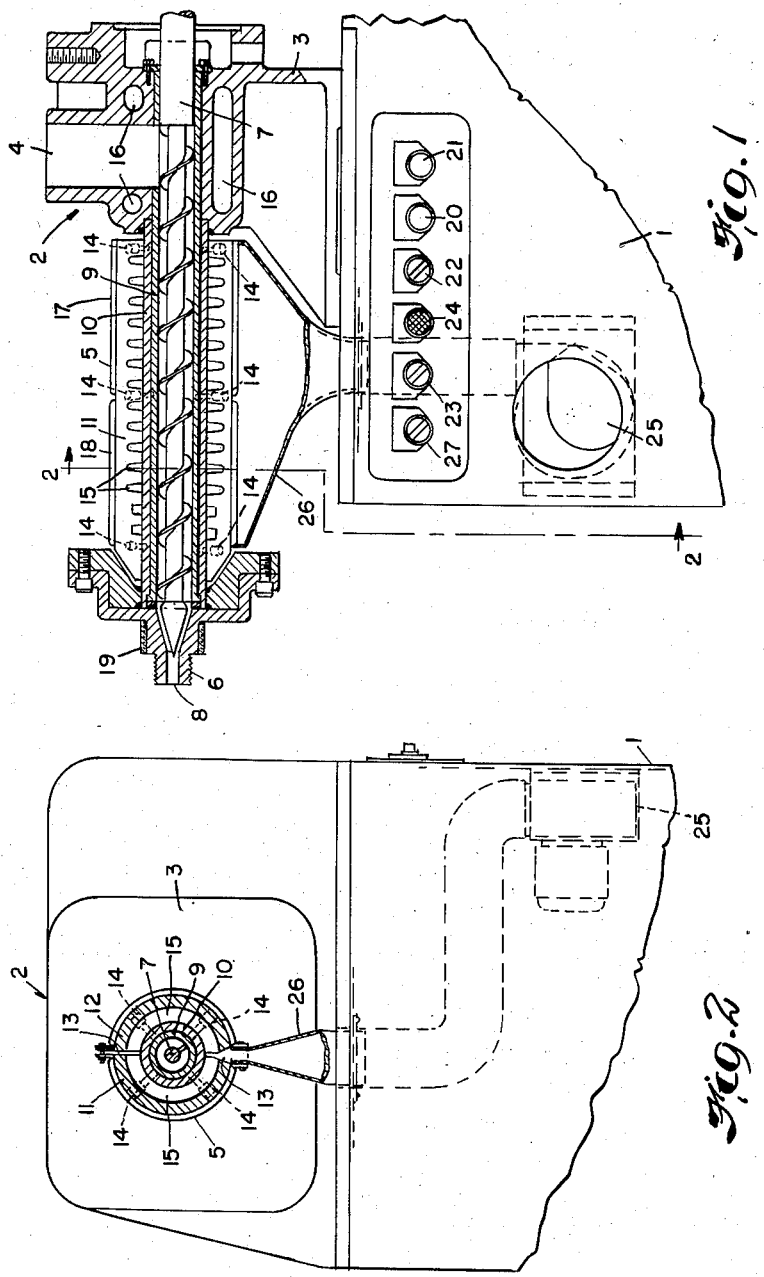
INVENTOR.
HANS E. BUECKEN
BY
Oberlin & Limbach
ATTORNEYS.

Patented Nov. 13, 1951

2,574,907

UNITED STATES PATENT OFFICE 2,574,907

EXTRUSION APPARATUS

Hans E. Bücken, Akron, Ohio, assignor to National Rubber Machinery Company, Akron, Ohio, a corporation of Ohio Application September 9, 1949, Serial No. 114,745

7 Claims. (Cl. 18—12)

The present invention relates to an extrusion apparatus which embodies certain improvements over the apparatus disclosed in the co-pending application, Serial No. 46,607, of Hans E. Buecken and Eugene E. Heston, filed August 28, 1948.

The present invention, like that disclosed in the aforesaid application, is concerned primarily with the heat control of an extrusion cylinder whereby desired temperatures are maintained therealong during the normal operation of the extrusion apparatus and overheating of the cylinder is prevented upon shutting down of the apparatus or during abnormal operation thereof.

An object of this invention is to provide an extrusion apparatus in which such heat control is obtained in a most efficacious manner.

Another object of this invention is to provide an extrusion apparatus having novel means for obtaining a balance between the heat input and heat dissipation both when the apparatus is in operation and when it is shut down.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail one illustrative embodiment of the invention, this being indicative, however, of but one of the various ways in which the principle of the invention may be employed.

In said annexed drawing:

Fig. 1 is a side elevation view of the apparatus with the extrusion cylinder in longitudinal cross-section; and Fig. 2 is a transverse cross-section view taken substantially along the line 2—2, Fig. 1.

Referring now to the drawing, the reference numeral 1 denotes the base of the apparatus which contains the control elements and on which is mounted the extrusion apparatus 2, said extrusion apparatus comprising a body 3 provided with a lateral opening 4 for material to be plasticized and extruded, a cylinder assembly 5, a die head 6, and an extrusion screw 7 extending through said body and cylinder assembly and rotatable therein to apply pressure on material to force the material which is introduced through the opening 4 along the screw and out through the die orifice 8.

The cylinder assembly 5 as herein illustrated comprises an inner removable liner 9, a surrounding sleeve 10 welded or otherwise secured to body 3, and a two-piece temperature control jacket 11—12. The parts 11 and 12 of said temperature control jacket are respectively secured to the sleeve 10 as, for example, by the bolts 14 and each part is of generally semi-annular form as shown forming longitudinally extending spaces or slots 13 between the adjacent edges thereof. Said parts 11 and 12 are each formed with a series of transverse internal grooves 15 which terminate at such longitudinally extending spaces 13 and which as shown are relatively narrow axially of the cylinder to leave ribs having a maximum contact area with the sleeve 10 for maximum heat transfer by conduction, either for input (heating) or for output (cooling). Furthermore, said grooves 15 are of considerable radial depth to thereby provide a maximum area for radiation to circulating air as will be hereinafter described. It is to be noted that the grooves adjacent the extrusion end of the cylinder are of smaller cross-sectional area than the remaining grooves.

As will hereinafter appear, it is desirable to have metal-to-metal contact between the jacket parts 11 and 12 and sleeve 10 to provide adequate heat transfer capacity through said parts and sleeve to the liner 9. It is to be understood that, if desired, the sleeve 10 may be formed with radially projecting ribs forming the grooves 15 between such ribs and longitudinally extending slots 13 cut through such ribs.

Formed in said body 3 are passages 16 through which a temperature modifying medium such as water, for example, is adapted to be circulated in order to maintain the temperature of the apparatus at a desired value adjacent the inlet end thereof.

Around the jacket parts 11 and 12 are suitable heaters such as the adjacent electrical heaters 17 and 18 which are operative to desirably heat the cylinder assembly 5 to different temperatures therealong, preferably progressively hotter from the inlet end to the extrusion end. Finally, a suitable heater 19 is associated with the die head 6 to effect complete plasticization of the material just prior to its being extruded through the die orifice 8.

The drive motor (not shown) for driving the screw 7 is controlled by start and stop switches 20 and 21; the heaters 17 and 18 are controlled by a switch 22; and the heater 19 is controlled by a switch 23 and an indicator 24, said switches and indicator being mounted in a group on one side of base 1 as shown.

Mounted within said base 1 is an electric motor-operated blower 25 of any conventional form provided with a damper at the intake to control the capacity of the intake air and having an air discharge duct 26 which is flared, as shown, to extend longitudinally along the entire lengths of the jacket parts 11 and 12 and is fitted between the bottom space or slot 13 defined between said jacket parts to thus circulate air through the grooves 15 and out through the top space or slot 13. Said blower is controlled by a switch 27 also mounted on base 1 along with the previously described switches.

In normal operation of the apparatus, with temperature modifying medium circulating through the passages 16, with the heaters 17, 18, and 19 energized, and with the screw 7 rotating within the cylinder assembly 5, the material which is fed into the opening 4 will be urged toward the left as viewed in Fig. 1 and will be heated during such movement and finally completely plasticized just prior to extrusion through the die orifice 8. During such operation the blower 25 will preferably be continuously operated to circulate temperature modifying medium, preferably air at room temperature, simultaneously through all of the grooves 15 and in this way eliminate "hot spots" along the cylinder and assure uniform temperature of the inner wall of cylinder liner 9 along the respective heaters 17 and 18.

On the other hand, when the apparatus is shut down thereby causing the movement of the material to stop in contact with the heated walls of cylinder 9, the continuing circulation of air by blower 25 through the grooves 15 dissipates heat sufficiently rapidly to preclude overheating and consequent decomposing of the material.

By providing inlet and discharge passages in the cylinder assembly 5 in the form of longitudinally extending spaces or slots 13 which communicate with the series of transverse passages or grooves 15, the temperature modifying medium simultaneously enters all of such passages to effect a more rapid dissipation of heat than is obtainable in an apparatus provided, for example, with long spiral passages into which temperature modifying medium is introduced at widely spaced intervals. Moreover, it is to be noted that the grooves 15 are each relatively short, whereby to reduce the temperature gradient of the temperature modifying medium between its entrance and discharge from the grooves. This, as apparent, tends to maintain more uniform the temperature of the cylinder assembly circumferentially therearound.

Although the blower 25 is herein illustrated as having its air discharge duct 26 fitted into or registering with the bottom slot 13 of the cylinder assembly, it is apparent that in some instances it may be desirable to reverse the blower connections and make the duct 26 the suction duct in which case room temperature air will be drawn in through the upper slot 13, through the grooves 15, and thence through the bottom slot 13 into the duct 26. Similarly, the duct 26 may, if desired, be fitted into the upper slot 13 and the blower 25 connection in either direction.

In the illustrated example of the invention although the jacket around the cylinder comprises the parts 11 and 12, it is apparent that more than two segmental parts may be provided if desired, in which case the duct 26 will be connected to at least one of the slots or spaces formed between the segmental parts for introducing a temperature modifying medium through the grooves and slots.

As in the aforesaid co-pending application, the cylinder heaters are preferably automatically controlled to deenergize the heaters whenever the cylinder is heated to a predetermined maximum temperature. When the heaters are thus deenergized any excess frictional heat generated by the working of the material by screw 7 which cannot be dissipated immediately due to the inertia of the heat in the heater is effectively dissipated by the continuous circulation of temperature modifying medium through the grooves 15 of the cylinder to thereby preclude a further temperature rise of the cylinder.

Other modes of applying the principle of the invention may be employed, change being made as regards the details described, provided the features stated in any of the following claims, or the equivalent of such, be employed.

I therefore particularly point out and distinctly claim as my invention:

1. In an extrusion apparatus, the combination of an extrusion cylinder, a jacket for said cylinder comprising a plurality of segmental parts embracing the periphery of said cylinder with the opposed edges of adjacent segmental parts spaced apart to provide longitudinally extending slots, said jacket parts being formed with a series of transverse grooves on their inner surfaces leading from one edge to the other, and a duct in communication with at least one of such slots for introducing a temperature modifying medium through such grooves and such slots.

2. In an extrusion apparatus, the combination of a heated extrusion cylinder which includes inner and outer cylinder portions, said outer portion comprising a pair of jacket parts each of generally semi-annular cross-section with opposed edges spaced apart to form a pair of longitudinally extending slots, each of said jacket parts being formed with a series of transverse grooves on its inner surface leading from one edge to the other, and a duct in communication with one of such slots for circulating a temperature modifying medium through such grooves and out through the other of such slots.

3. In an extrusion apparatus, the combination of a heated extrusion cylinder which includes inner and outer cylinder portions, said outer portion comprising a pair of jacket parts each of generally semi-annular cross-section with opposed edges spaced apart to form a pair of longitudinally extending slots, each of said jacket parts being formed with a series of transverse grooves on its inner surface leading from one edge to the other, a duct in communication with one of such slots for circulating a temperature modifying medium through such grooves and out through the other of such slots, and electric heating means around said outer portion of said cylinder.

4. In an extrusion apparatus, the combination of a heated extrusion cylinder which includes inner and outer cylinder portions, said outer portion comprising a pair of jacket parts each of generally semi-annular cross-section with opposed edges spaced apart to form a pair of longitudinally extending slots, each of said jacket parts being formed with a series of transverse grooves on its inner surface leading from one edge to the other, and a duct in communication with one of such slots for circulating a temperature modifying medium through such grooves and out through the other of such slots, the inner surfaces of said jacket parts between such grooves being in contact with said inner portion.

5. In an extrusion apparatus, the combination of a heated extrusion cylinder which includes inner and outer cylinder portions, said outer portion comprising a pair of jacket parts each of generally semi-annular cross-section with opposed edges spaced apart to form a pair of longitudinally extending slots, each of said jacket parts being formed with a series of transverse grooves on its inner surface leading from one edge to the other, and a duct in communication with one of such slots for circulating a temperature modifying medium through such grooves and out through the other of such slots, the inner surfaces of said jacket parts between such grooves being in contact with said inner portion, such grooves being relatively narrow to provide relatively wide inner surfaces on said jacket parts in heat conductive contact with said inner portion and being relatively deep radially to provide relatively large areas for heat radiation to the temperature modifying medium circulated through such grooves.

6. In an extrusion apparatus, the combination of an extrusion cylinder, a jacket for said cylinder comprising a plurality of segmental parts embracing the periphery of said cylinder with the opposed edges of adjacent segmental parts spaced apart to provide longitudinally extending slots, said jacket parts and cylinder forming between them a series of passages extending circumferentially around said cylinder and having communication with such slots, and a duct in communication with at least one of such slots for introducing a temperature modifying medium through such passages and such slots.

7. In an extrusion apparatus, the combination of an extrusion cylinder formed with a series of passages extending circumferentially around said cylinder and with a continuous slot extending longitudinally of said cylinder and having communication with such series of passages, and a duct substantially coextensive with such slot and in communication with such slot for introducing a temperature modifying medium simultaneously into such series of passages.

HANS E. BÜCKEN.

REFERENCES CITED

The following references are of record in the file of this patent:

UNITED STATES PATENTS

| Number | Name | Date |
|---|---|---|
| 2,433,936 | Tornberg | Jan. 6, 1948 |